US007440439B2

(12) United States Patent
Johansson et al.

(10) Patent No.: US 7,440,439 B2
(45) Date of Patent: Oct. 21, 2008

(54) METHOD OF INQUIRING

(75) Inventors: Hans Johansson, London (GB); Stefan Johansson, Stockholm (SE)

(73) Assignee: Microsoft Corporation, Redmond, WA (US)

( * ) Notice: Subject to any disclaimer, the term of this patent is extended or adjusted under 35 U.S.C. 154(b) by 838 days.

(21) Appl. No.: 10/034,238

(22) Filed: Dec. 27, 2001

(65) Prior Publication Data
US 2002/0089968 A1    Jul. 11, 2002

(30) Foreign Application Priority Data
Jan. 3, 2001    (SE)    .................................... 0100014

(51) Int. Cl.
H04J 3/24    (2006.01)
(52) U.S. Cl. ..................... 370/349; 370/471; 455/456.2
(58) Field of Classification Search ................. 370/349, 370/328, 329, 389, 338, 468, 351, 352, 401, 370/400, 403, 337, 471; 455/456.3, 456.2
See application file for complete search history.

(56) References Cited

U.S. PATENT DOCUMENTS

| 4,994,966 A | 2/1991 | Hutchins | 364/419 |
| 5,233,611 A | 8/1993 | Triantafyllos | 371/16.1 |
| 5,351,235 A | 9/1994 | Lathinen | 370/58.1 |
| 5,371,883 A | 12/1994 | Gross | 395/575 |
| 5,475,374 A | 12/1995 | Moore | 340/825.22 |
| 5,481,544 A | 1/1996 | Baldwin | 370/94.1 |
| 5,521,849 A | 5/1996 | Adelson | 364/570 |
| 5,638,450 A | 6/1997 | Robson | 380/49 |
| 5,654,957 A | 8/1997 | Koyama | 370/60.1 |
| 5,742,905 A | 4/1998 | Pepe | 455/461 |
| 5,761,201 A | 6/1998 | Vaudreuil | 370/392 |
| 5,809,108 A | 9/1998 | Thompson | 379/15 |
| 5,872,523 A | 2/1999 | Dellaverson | 340/825.52 |

(Continued)

FOREIGN PATENT DOCUMENTS

CA    2302801 A1    9/2001

(Continued)

OTHER PUBLICATIONS

GSM 03.40, Digital Cellular telecommunications system (phase 2+); Technical realization of the Short Message Service (SMS); point-to-point (PP); ETSI, Version 6.0.0, Mar. 1998- entire document.

(Continued)

*Primary Examiner*—Chi H. Pham
*Assistant Examiner*—Alexander Boakye
(74) *Attorney, Agent, or Firm*—Workman Nydegger

(57) ABSTRACT

Packet data transmissions from network servers are provided to wireless communication stations via wireless communication networks. A network server 30 about to transmit packet data to a wireless communication station 20 first requests the wireless station 20 to provide its radio transferring capabilities to the server 30. Based on these radio transferring capabilities, the information content to be transferred from the server 30 to the wireless station 20, via a wireless communication network 10 and any operatively connecting the server with the wireless network 10, is adapted so that the resulting packet data transmission is suitable for the radio transferring capabilities of the wireless station 20. This results in a reasonable transmission time in elimination of any annoying transmission delays due to bandwidth capacity problems.

21 Claims, 2 Drawing Sheets

U.S. PATENT DOCUMENTS

| | | | |
|---|---|---|---|
| 5,895,471 A | 4/1999 | King | 709/218 |
| 5,901,359 A | 5/1999 | Malmstrom | 455/461 |
| 5,915,222 A | 6/1999 | Olsson | 455/466 |
| 5,920,821 A | 7/1999 | Seazholtz | 455/466 |
| 5,928,325 A | 7/1999 | Shaughnessy | 709/206 |
| 5,958,018 A | 9/1999 | Eng | 709/246 |
| 5,961,609 A | 10/1999 | Kayes | 709/300 |
| 6,006,091 A | 12/1999 | Lupien | |
| 6,018,657 A | 1/2000 | Kennedy | 455/426 |
| 6,047,194 A | 4/2000 | Andersson | 455/466 |
| 6,047,327 A | 4/2000 | Tso | 709/232 |
| 6,091,945 A | 7/2000 | Oka | 455/411 |
| 6,091,958 A | 7/2000 | Bergkvist | 455/432 |
| 6,094,426 A | 7/2000 | Honkasalo | 370/331 |
| 6,094,575 A | 7/2000 | Anderson | 455/422 |
| 6,101,393 A | 8/2000 | Alperovich | 455/466 |
| 6,122,523 A | 9/2000 | Zicker | 455/551 |
| 6,125,278 A * | 9/2000 | Wieczorek et al. | 455/437 |
| 6,125,281 A | 9/2000 | Wells | 455/466 |
| 6,128,761 A | 10/2000 | Benayoun | 714/758 |
| 6,138,158 A | 10/2000 | Boyle | 709/225 |
| 6,154,461 A | 11/2000 | Sturniolo | 370/401 |
| 6,158,031 A | 12/2000 | Mack | 714/724 |
| 6,182,245 B1 | 1/2001 | Akin | 714/38 |
| 6,195,534 B1 | 2/2001 | Sakoda | 455/45 |
| 6,205,330 B1 | 3/2001 | Winbladh | 455/426 |
| 6,212,173 B1 | 4/2001 | Lindsay | 370/331 |
| 6,216,104 B1 | 4/2001 | Moshfeghi | 704/260 |
| 6,223,028 B1 * | 4/2001 | Chang et al. | 455/419 |
| 6,226,279 B1 | 5/2001 | Hansson | 370/329 |
| 6,298,231 B1 | 10/2001 | Heinz | 455/413 |
| 6,311,282 B1 | 10/2001 | Nelson | 713/324 |
| 6,356,543 B2 | 3/2002 | Hall | 370/352 |
| 6,360,257 B1 | 3/2002 | Rydberg | 709/223 |
| 6,389,008 B1 | 5/2002 | Lupien | 370/352 |
| 6,415,156 B1 | 7/2002 | Stadelmann | 455/466 |
| 6,427,000 B1 | 7/2002 | Mumford | 379/9 |
| 6,484,282 B1 | 11/2002 | Tsuto | 714/738 |
| 6,519,234 B1 | 2/2003 | Werkander | 370/328 |
| 6,519,241 B1 | 2/2003 | Theimer | 370/338 |
| 6,519,265 B1 | 2/2003 | Liu | 370/463 |
| 6,535,586 B1 | 3/2003 | Cloutier | 379/88.13 |
| 6,574,201 B1 | 6/2003 | Kreppel | 370/328 |
| 6,577,874 B1 | 6/2003 | Dailey | 455/521 |
| 6,587,693 B1 | 7/2003 | Lumme | 455/466 |
| 6,608,832 B2 | 8/2003 | Forslöw | 370/353 |
| 6,614,774 B1 | 9/2003 | Wang | 370/401 |
| 6,625,652 B1 | 9/2003 | Miller | 709/227 |
| 6,629,130 B2 | 9/2003 | Mertama | 709/206 |
| 6,636,502 B1 | 10/2003 | Lager | 370/352 |
| 6,654,789 B1 | 11/2003 | Bliss | 709/206 |
| 6,661,782 B1 | 12/2003 | Mustajarvi | 370/331 |
| 6,697,942 B1 | 2/2004 | L'Heureux | 713/152 |
| 6,704,295 B1 | 3/2004 | Tari | 370/352 |
| 6,721,288 B1 | 4/2004 | King | 370/310 |
| 6,738,636 B2 | 5/2004 | Lielbriedis | 455/466 |
| 6,757,266 B1 | 6/2004 | Hundscheidt | 370/328 |
| 6,799,039 B2 * | 9/2004 | Wu et al. | 455/436 |
| 6,804,796 B2 | 10/2004 | Gustavsson | 714/38 |
| 6,813,502 B2 * | 11/2004 | Son et al. | 455/456.3 |
| 6,822,955 B1 | 11/2004 | Brothers | 370/389 |
| 6,898,422 B2 | 5/2005 | Bern | 455/412.1 |
| 6,937,566 B1 | 8/2005 | Forslöw | 370/231 |
| 6,950,809 B2 | 9/2005 | Dahan | 705/76 |
| 7,006,609 B2 | 2/2006 | Cloutier | 379/88.13 |
| 7,025,209 B2 | 4/2006 | Hawkins | 709/200 |
| 7,085,553 B1 * | 8/2006 | Harrenstien et al. | 455/412.2 |
| 7,103,380 B1 | 9/2006 | Ditzik | 455/556.2 |
| 7,130,918 B2 | 10/2006 | Ouzounidis | 709/238 |
| 7,203,733 B1 | 4/2007 | Bern | 709/218 |
| 2001/0014085 A1 | 8/2001 | Johansson | 370/338 |
| 2001/0015977 A1 | 8/2001 | Johansson | 370/392 |
| 2001/0034225 A1 | 10/2001 | Gupte | 455/412 |
| 2002/0098855 A1 | 7/2002 | Hartmaier | 455/466 |

FOREIGN PATENT DOCUMENTS

| | | |
|---|---|---|
| EP | 0777394 A1 | 4/1997 |
| EP | 0801512 A2 | 10/1997 |
| EP | 0833492 A2 | 4/1998 |
| EP | 0924918 A2 | 6/1999 |
| EP | 1014265 A1 | 6/2000 |
| EP | 1083768 A1 | 3/2001 |
| GB | 2348525 A | 4/2000 |
| GB | 2 348 525 A | 10/2000 |
| WO | WO 93/16564 | 8/1993 |
| WO | WO 97/08906 | 3/1997 |
| WO | WO 97/18651 | 5/1997 |
| WO | WO 97/20443 | 6/1997 |
| WO | WO 97/25746 | 7/1997 |
| WO | WO 97/26764 | 7/1997 |
| WO | WO 98/03005 | 1/1998 |
| WO | WO 98/11744 | 3/1998 |
| WO | WO 98/30051 | 7/1998 |
| WO | WO 98/48549 | 10/1998 |
| WO | WO 98/58476 | 12/1998 |
| WO | WO 99/05828 | 2/1999 |
| WO | WO 99/12364 | 3/1999 |
| WO | WO 99/12365 | 3/1999 |
| WO | WO 99/13448 | 3/1999 |
| WO | WO 99/16263 | 4/1999 |
| WO | WO 99/16268 | 4/1999 |
| WO | WO 99/17579 | 4/1999 |
| WO | WO 99/37104 | 7/1999 |
| WO | WO 99/43143 | 8/1999 |
| WO | WO 99/52247 | 10/1999 |
| WO | WO 99/63742 | 12/1999 |
| WO | WO 99/65256 | 12/1999 |
| WO | WO 00/02403 | 1/2000 |
| WO | WO 00/35214 | 6/2000 |
| WO | WO 00/48099 | 8/2000 |
| WO | WO 00/56008 | 9/2000 |
| WO | WO 00/64110 | 10/2000 |
| WO | WO 00/79811 | 12/2000 |

OTHER PUBLICATIONS

Hoff, Simon et al. *Analysis of the General Packet Radio Services (GPRS) of GSM as Access to the Internet*, International Conference on Universal Personal Communications, vol. 1, Oct. 9, 1998, pp. 415-419.

Meyer, Michael, *TCP Performance Over GPRS*, Wireless Communications and Networking Conference, vol. 3, 1999, pp. 1248-1252.

Cai, Jian et al., *General Packet Radio Service in GSM*, IEEE Communications Magazine, Oct. 1997, pp. 122-131.

RFC 1630 "Universal Resource Identifiers in WWW" Berners-Lee, Jun. 1994.

M.R. Croak, *Unified Messaging Will Deliver The Message*, AT&T Technology, American Telephone & Telegraph Co., Short Hills, New Jersey, vol. 4, No. 2, 1989, pp. 2-5.

Martin F. Parker, et al., *Unified Messaging—A Value—Creating Engine for Next—Generation Network Services*, Bell Labs Technical Journal, vol. 4, No. 2, pp. 71-87, Apr.-Jun. 1999.

Suhayya Abu-Hakima, et al., *A Common Multi-Agen Testbed for Diverse Seamless Personal Information Networking Application*, IEEE Communications Magazine, vol. 36, No. 7, pp. 68-74, Jul. 1998.0.

John F. Meech, et al., *Intelligent Seamless Messaging*, Proceedings of the IEEE International Conference on Systems, Man and Cybernetics, vol. 2, pp. 1241-1244, 1998.0.

Ramiro Liscano, et al., Integrating Multi-Modal Messages Across Heterogenous, Proceedings of the 1997 1st IEEE Enterprise Networking Mini-Conference, Montreal, Que., Canada, pp. 45-53, Jun. 11-12, 1997.

R. Han et al., *Dynamic Adaptation in an Image Transcoding Proxy for Mobile Web Browsing*, IEEE Personal Communications, vol. 5, No. 6, Dec. 1, 1998, pp. 8-17.

H. Bhardvaj et al., *An Active Transcoding Proxy to Support Mobile Web Access*, Reliable Distributed Systems, Oct. 1998, pp. 118-123.

Anupam Joshi, *On Proxy Agents, Mobility and Webb Access*, Baltzer Mobile Networks and Applications, May 2000, pp. 1-19.

A. Fox et al., *Adapting to Network and Client Variation Using Infrastructural Proxies: Lessons and Perspectives*, IEEE Personal Communications, vol. 5, No. 4, Aug. 1, 1998, pp. 10-19.

\* cited by examiner

METHOD OF INQUIRING

CROSS-RELATED TO RELATED APPLICATIONS

This application claims priority to Swedish Patent Application No. 0100014-0, filed Jan. 3, 2001, which is incorporated herein by specific reference.

1. Technical Field

The present invention relates to packet data transmissions from network servers to wireless communication stations via wireless communication networks.

2. Background of the Invention

Today, different kind of digital radio communications networks that support packet data transfer are being evolved. This means that mobile users having access to these radio communication networks are provided with the possibility to communicate packet data with different packet data networks, such as with the Internet, but also with corporate intranets and X.25 networks and the like. Thus, the digital radio, or wireless, communication network will be a wireless extension of, for example, the Internet and existing X.25 networks. Subscribers to such a radio communication network, i.e., the mobile users, will be able to benefit from most of the applications designed for these data packet protocols, such as Web browsing and exchange of e-mails etc., from their wireless equipment with which they access the wireless communication networks. Furthermore, a number of new mobile data services are currently being developed which will make use of these packet data transfer capabilities, while the performance of existing mobile data services will be improved.

One of the most important grounds for the development described above is, besides the introduction of packet data transmissions to/from the wireless communication stations operated by the mobile users, the technology enhancements of the radio communications networks, such as the cellular radio communications networks, which provide higher and higher bandwidths for these packet data transmissions. Examples of wireless communication network with higher bandwidths and with support for packet data transfer to the wireless terminal of a mobile user are PDC-P networks (Pacific Digital Cellular), which in Japan provides the existing I-mode service, GSM networks (Global System for Mobile Communications) providing GPRS services (General Packet Radio Service), systems using radio networks based on EDGE technology (Enhanced Data Rates for GSM and TDMA/136 Evolution) or on WCDMA technology (Wideband Code Division Multiple Access), or any other forthcoming new generation of wireless communication networks which are known as UMTS networks (Universal Mobile Telephony Standard), or 3G networks, and which are based on the broadband radio networks WCDMA or cdma2000.

When a packet switched connection, rather than a circuit switched connection, is used for transferring data to/from a user's wireless station, which for example is the case when introducing GPRS in a GSM system, it will be possible for the mobile user to be constantly connected not only to the wireless network, but also to the Internet or some other packet data network via the wireless network and an interconnecting gateway. As the mobile user is constantly connected, the user will be charged for the actual bandwidth he uses. This means that the mobile user will be charged for each packet transmitted or received by the user, rather than for the time duration of the data transfer.

However, even if a user is charged for actual bandwidth used, it will still be desired by the user to keep time duration for received data transmissions as low as possible. The reason being that a longer transmission time, and thus longer delays for receiving the actual information, will occupy the user's attention and have a bad impact on the user's experience of the information reception and any service associated therewith. Thus, regardless of whether or not the user is constantly connected, unnecessary delays relating to the information transfer to the user should be avoided.

SUMMARY OF THE INVENTION

An object of the present invention is to provide improvements in connection with packet data transmissions to wireless communication stations and their associated end users which enhance the end user experience of the packet data transmission and any service associated therewith.

According to the present invention, said object is achieved by methods, computer-readable mediums, a server and a wireless communication station having the features as defined in the appended claims and representing different aspects of the invention.

The present invention is based on the idea that a server about to transmit packet data to a wireless communication station first requests the wireless station to provide its radio transferring capabilities to the server. Based on these radio transferring capabilities, the information content to be transferred from the server to the wireless station, via a wireless communication network and any network operatively connecting the server with the wireless network, is adapted so that the resulting packet data transmission is suitable for the radio transferring capabilities of the wireless station.

The present invention is applicable in wireless environments which are associated with low and/or varying bandwidths, limited and differing capacities of the wireless stations, requirements to send as little data as possible over the air, etc. Using the present invention, a server or any other originator of information residing outside of a wireless communication network is provided with information about a wireless communication station's radio transferring capabilities. By taking the radio transferring capabilities into consideration, such as limitations on the bandwidth with which the wireless station at a particular point of time can receive packet data, the information content is adapted, i.e., dynamically changed, so that delays and total transferring time is minimized, or at least reasonable. In this way the end user experience of receiving information via the wireless station will be greatly improved. Since such an information transfer in many cases is intimately associated with a service provided to the user of the wireless station, the user's experience of the provided service will be improved.

The information content can of course be adapted in many different ways, e.g., by extracting only the most relevant parts, or simply by leaving out anything following an initial information part. The importance is that the adapted information content is suitable for packet data transmissions to the wireless station regardless of the current limitations on the radio transferring capacity with which the wireless station can receive packet data. Since the end user will not experience any annoying delays when receiving the adapted information content, he can immediately acquire the most relevant part of, or simply a part of, the original information content.

The invention is also advantageous since it enables a user to be provided with packet data transmissions where the radio capabilities of wireless station currently used the user is considered. Thus, a user having a subscription with an operator of a wireless communication network can associate the same subscription with different wireless stations having different radio transferring capabilities, i.e., any high or low end wireless station, and always be provided with information content adapted to the capabilities of the currently used wireless station. Similarly, a user may have several subscriptions, each associated with a particular radio capability, wherein the information content and its resulting packet data transmission is adapted to the limitations of the particular subscription currently used.

The radio transferring capabilities of a wireless communication station is dependent on the capacity of the wireless communication station itself, i.e., the client capability, but also on the capacity, or utilization, of the wireless connection between the specific wireless station and the wireless communication network, i.e., the radio connection capability. In the context of the present invention, the expression radio transferring capabilities, or merely radio capabilities, encompass both the client capability and the radio connection capability.

The client capability is to its nature static and therefore included in a wireless station's static radio transferring capability. This static radio transferring capability, i.e., the capacity of the wireless communication station itself, depends on the design of the wireless station. Different wireless stations have different multi-slot capacity, belongs to different power classes etc.

The radio connection capability discussed above is to its nature dynamic and therefore included in a wireless station's dynamic radio transferring capability. This dynamic radio transferring capability, which is assigned to the wireless station by the wireless communication network, changes over time and effects the capacity of the wireless connection between the wireless station and the wireless communication network, and thus the radio transferring capabilities associated with the wireless station. A typical dynamic capability is the radio priority assigned by the wireless network to the wireless station. The radio priority changes over time as a consequence of, e.g., the number of wireless stations currently served by the same antenna of the wireless network. Note however that the dynamic radio capability also may include the connection capability internal to the wireless communication network, such as the quality of service provided within the wireless network for a specific connection. This quality of service effecting to dynamic radio capability of the wireless station.

According to the invention, a server is provided with knowledge of either the static capability of the wireless station, the current dynamic capability, or a combination thereof. Thus, a server is provided with knowledge of the radio transferring capabilities of the wireless station which can be used for adapting the information content in different ways in dependence upon the particular wireless station's inherent bandwidth capacity, and/or in dependence upon the current available over-the-air bandwidth assigned by the wireless network to the particular wireless station.

In addition to the current capacity of the wireless connection between the station and the network, the dynamic radio transferring capabilities could preferably also include a current core network quality of service, which at a particular time is associated with the core network of the wireless network and which effects the transferring capabilities through the wireless network.

According to an embodiment of the invention, the request sent from a server wishing to transmit packet data to a wireless station is transmitted in a short message provided by a short message service. Preferably, the request is accompanied by a packet data network address of the server. This network address is used by the wireless station when establishing a packet data connection with the server. The server then transmits the packet data over the established packet data connection. In this way the invention may advantageously be practiced when a server whishes to transfer packet data to a wireless station with which it has no established packet data session. Since it is the wireless station that establishes the packet data connection between the server and the wireless station, there is no need for a server to beforehand know the packet data network address of the wireless station in order to establish a packet connection for transmission of packet data. This in turn has the further advantage that the server does not generate any signaling load against any repository in the wireless network storing packet data network addresses, something which otherwise can be a heavy burden on the repository when numerous servers are trying to acquire packet network addresses to wireless stations connected to the wireless network. Furthermore, if dynamic packet data network addresses are used by the wireless network, which most often is the case, the burden will be even heavier since the network address allocated to a specific wireless station will change from time to time. Moreover, when a wireless station is roaming between different wireless networks of different operators, the problem of determining to which operator's repository a server's requests for a packet data network addresses should be routed is avoided.

It is to be understood that what is meant by the expression wireless communication station in this document, sometimes herein referred to only as wireless station, is either a stand-alone RF (Radio Frequency) transceiver having processing capabilities and displaying means, such as a mobile telephone or a hand held PDA (Personal Digital Assistant), or, a RF transceiver together with any kind of portable or stationary equipment having processing capabilities, such as a portable laptop computer or a stationary personal computer, wherein the RF transceiver is arranged in communication with the portable or stationary equipment.

Even though the following description of an exemplifying embodiment will refer to a GSM network providing a GPRS service and an SMS-C (Short Message Service Center) providing a short message service, it is to be understood by those skilled in the art that the invention is not limited to these systems. The invention is advantageously applied in connection with any wireless communication network that provides packet data transmissions to its connected users and that, if so required by the invention, has an associated message service for transmitting short messages to the users. Such wireless communication networks have been exemplified in the background part of this application.

BRIEF DESCRIPTION OF THE DRAWINGS

Further features and advantages of the invention will become more readily understood from the following detailed description of exemplifying embodiments of the invention when taken in conjunction with the accompanying drawings in which like reference characters are used for like features, and in which.

DETAILED DESCRIPTION OF THE INVENTION

Figure 1:
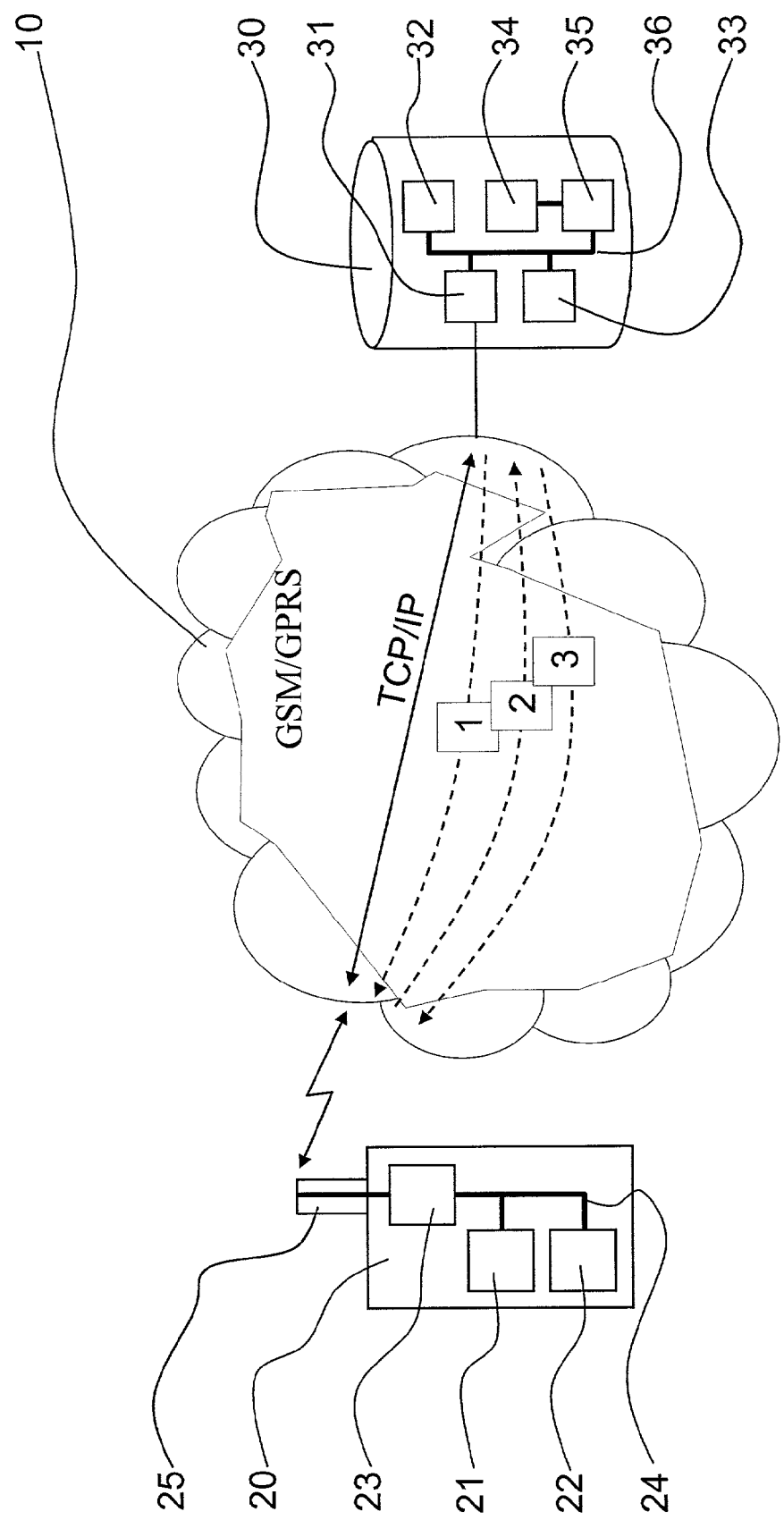
FIG. 1 schematically shows an exemplifying overall system environment in which an embodiment of the invention is included and operable.

With reference to FIG. 1, an exemplifying embodiment of the invention will know be described in greater detail. FIG. 1 shows a wireless communication network 10, a wireless communication station 20, and a server 30 operatively connected to the wireless communication network 10. The server 30 could be any originator of information connected to any packet data network (not shown) which in turn is operatively connected to the wireless communication network 10. The wireless communication network 10 is exemplified with a GSM network (Global System for Mobile Communication) and the wireless communication station 20 with a GPRS mobile station. The packet data transferring capabilities of the GSM network 10 is provided by the GPRS service (General Packet Radio Service). GPRS being a standardization from the European Telecommunications Standard Institute (ETSI) on packet data in GSM systems.

The architecture and operation of a GSM Network providing a GPRS service, also denoted GSM/GPRS network, as well as the standardization thereof, should be well known to persons skilled in the art. For this reason, only those features or aspects of GSM and GPRS that are of interest for understanding this embodiment of the invention will be described herein.

A GSM network 10 which includes a GPRS service for handling packet data traffic is equipped with a Serving GPRS Support Node (SGSN) (not shown) and a Gateway GPRS Support Node (GGSN) (not shown). The SGSN is the node within the GSM infrastructure that sends and receives packet data to and from a wireless GPRS mobile station 20 via a Base Station System (not shown). The GPRS mobile station 20 communicates with the Base Station System over an air interface in accordance with the standardization of GSM and GPRS. The SGSN also transfers packets between the GPRS station 20 and the GGSN. Furthermore, the SGSN handles PDP contexts (Packet Data Protocol) for connections with any server in any external packet data network, such as with server 30 which is operatively connected to the GSM/GPRS network 10. The GGSN, which is connected to the SGSN, is the gateway of the GSMlGPRS system to external packet data networks and routes packets between the SGSN and an external packet data network, e.g., the Internet or an corporate Intranet.

For more information about GPRS, reference is made to ETSI standardization documents EN 301 113 V6.1.1 (1998-11) and Draft ETSI EN 301 344 V6.4.0 (1999-08), both documents which are incorporated herein by reference.

The wireless communication station of the present invention, i.e., the GPRS mobile station 20 in the embodiment of FIG. 1, includes a state of the art microprocessor 21, a main memory 22 implemented by read only memory (ROM) and/or random access memory (RAM) or equivalents thereof, Input/output circuitry (not shown), such as a display and a keyboard/keypad for communicating with a user, interface circuitry 23 in the form of transmitting/receiving radio frequency circuitry for communicating with the GSM/GPRS network 10 via an antenna 25 and the air interface, and a bus 24 interconnecting the elements of the GPRS mobile station, as well as other appropriate components. Of these elements, at least some are controlled or otherwise designed to facilitate the practice of a method of a wireless communication station in accordance with the invention.

The microprocessor 21 executes appropriate computer-executable components stored in the main memory 22, thus controlling the elements and the overall GPRS mobile station 20 to function in accordance with the method of the invention. Alternatively, these computer-executable components are stored on a pre-recorded disk, in a pre-programmed memory device, or any other computer-readable medium being separate from the wireless communication station 20. When the wireless communication station 20 and its included microprocessor 21 is provided with access to this computer-readable medium, its stored computer-executable components will direct the microprocessor 21 to control the overall wireless communication station 20 to function in accordance with the method of the invention. The operation of the GPRS mobile station 20 in accordance with the embodiment will be more fully understood from the description below.

The server 30 is operatively connected to the GSM/GPRS network 10, possibly via a packet data network (not shown), via interface circuitry means 31 which include appropriate hardware for packet data communication over a transport protocol such as TCP/IP or X25. The server 30 further includes a central processing unit (CPU) 32, a main memory 33, external memory 34 and one or more input/output-(I/O-) controllers 35 for connecting different peripheral devices to the server 30. As depicted in FIG. 1, the above-mentioned elements are all connected to a system bus 36.

The overall functioning of the server 30 is controlled by the CPU 32. The CPU operates under the control of executed computer program instructions that are stored in main memory 33 or in external memory 34. By executing these program instructions, the CPU 32 will control the overall server 30 to perform at least the functionality of the present invention. The CPU 32 controls and communicates with the various elements of the server by means of the system bus 36, which system bus has any of several types of bus structures including a memory bus, a peripheral bus, and a local bus implemented by any of a variety of bus architectures.

The main memory 33 is a computer-readable storage device, typically implemented by read only memory (ROM) and/or random access memory (RAM), which provide the CPU with fast access to computer-readable program instructions and information data stored by the main memory. The external memory 34 is any computer-readable media that provides a non-volatile storage of computer-readable program instructions and information data and is typically implemented by a magnetic or optical disk which either is stationary or removable and which is connected to the I/O-controller 35 via appropriate disk drive circuitry. It should be appreciated that the server 30 may include, or be connected to, various other computer-readable devices or media, which are accessible by the CPU 32, and which are capable of storing computer program instructions and/or information data.

The operation of the invention in accordance with the embodiment referred to by FIG. 1 will now be described in greater detail. This embodiment is advantageous when a packet data session already has been established between the wireless communication station 20, i.e., the GPRS mobile station, and the server 30.

1. In FIG. 1, an ongoing TCP/IP session between the server 30 and the GPRS station 20 is indicated. The operation in accordance with the embodiment starts when the server 30 is about to transfer information content to the GPRS station 20, either because the server 30 wants to push the information to the GPRS station 20, or because the GPRS station 20 has requested the server 30 to transfer the information.

Before the server 30 starts transmitting the information, an application executing on server 30 transmits a request message to the GPRS station 20 over the TCP/IP connection, as indicated with arrow 1. The message includes a request for information relating to the radio transferring capabilities of the receiving GPRS station.

2. Upon reception of the request, another application executing on the GPRS station 20 examines the request. This examination includes checking what radio capabilities the request concerns. If the request concerns the static capabilities of the GPRS station, a response message is prepared in which the radio access classmark of the GPRS station 20 is included.

The radio access classmark as such is defined by the GSM standardization. A GPRS station's radio access classmark defines the radio capabilities of the GPRS station. It includes the multi-slot capability as well as other static radio capabilities of the GPRS station. In general, according to the GSM standardization, the radio access classmark is to be used by a GPRS station for transmission to the SGSN, which in turn provides the base station system of the GSM/GPRS network with the classmark received from the GPRS station. The classmark is then used by the base station system when handling radio resource for the GPRS station in question. In the described embodiment, the radio access classmark is suitable as information relating to a GPRS station's 20 static radio capabilities when practicing the present invention.

If the above discussed request concerns the dynamic radio capabilities of the GPRS station, in addition, or as an alternative, to the static radio capabilities, parameters defining the dynamic capability of the GPRS station is included in the response message that is prepared by the GPRS station application. These parameters are acquired by the GPRS station 20 during interaction with the GSM/GPRS network 10. For example, as known to persons skilled in the art, the quality of service (QoS) that can be provided by the GSM/GPRS network 10 may be requested by the GPRS station 20 by transmitting a request for QoS profile. In response the GPRS station 20 will receive a negotiated QoS profile from the GSM/GPRS network 10. The dynamic radio capabilities may also concern the radio priority currently allocated to the particular GPRS station 20. The GPRS station can either be informed of its current radio priority by the GSM/GPRS network 10 when a PDP (Packet Data Protocol) context is activated, or it can receive radio priority information in a data packet during an ongoing PDP session, especially if the radio priority changes during that PDP session.

Arrow 2 in FIG. 1 indicates that a response message is transmitted from the GPRS station 20 to the server 30 over the TCP/IP connection. As described above, and in dependence upon what radio capabilities the received request concerned, the message includes the GPRS station's 20 current static and/or dynamic radio capabilities.

3. Upon reception of the response message from the GPRS station 20, the application executing on the server 30 extracts and analyses the included information resulting from its previous request, i.e., it analyses the current radio capabilities of the GPRS station 20.

As a result of the analysis, the server application will have knowledge of the maximum static and/or dynamic capability of the GPRS station, typically the maximum GPRS client capability and/or the maximum radio connection capability assigned to the GPRS client 20. These radio capabilities associated with the GPRS station 20 are stored at the server 30 by the server application.

The server application now adapts the information content to be transmitted to the GPRS station 20. This is for example performed in such way that the amount of information is reduced. As described earlier, the reduction can be accomplished in a numerous ways, e.g., by omitting selective parts of the information or by omitting any major information part. This reduction is performed while considering the limitation provided by the static and the dynamic radio capability. Typically, this includes considering which of the two capability limitations that provides the most limited bandwidth. Of course, if the information content from the beginning consists of a smaller amount of information which can be expanded, the server application may perform such an expansion so that maximum used is made of the radio capability associated with the GPRS station 20.

The adapted information content, either reduced or expanded, is then packetized and transmitted as packet data to the GPRS station 20, the transmission being indicated with arrow 3 in FIG. 1. As a consequence of the information adaptation, this packet data transmission now fits the bandwidth available for transmissions to the GPRS station 20. These operations result in a reasonable transmission time and in elimination of any annoying transmission delays due to bandwidth capacity problems.

Figure 2:
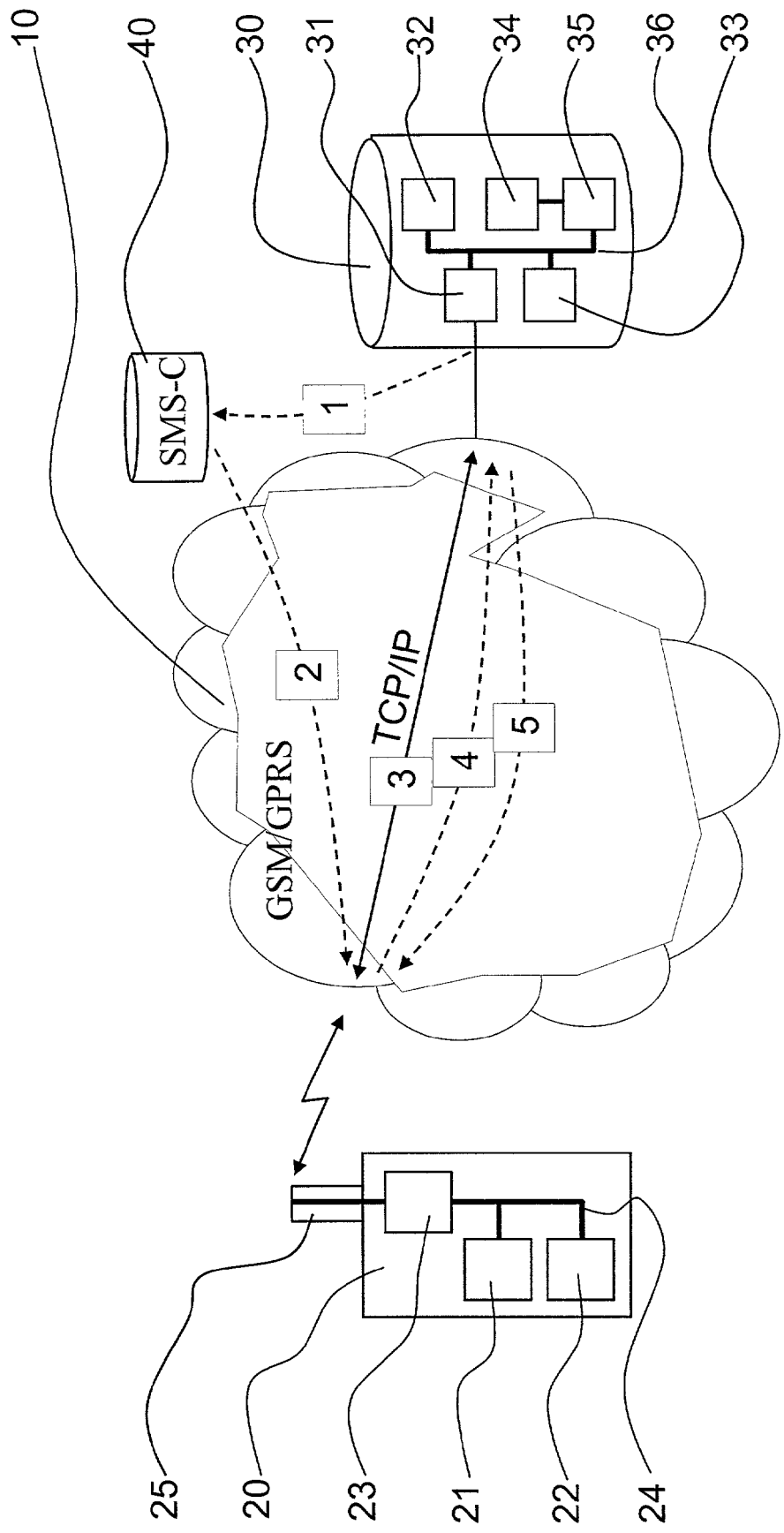
FIG. 2 schematically shows an exemplifying overall system environment in which another embodiment of the invention is included and operable.

With reference to FIG. 2, another exemplifying embodiment of the invention will know be described.

This embodiment is advantageous in a situation with no existing packet data session between the wireless communication station 20 and the server 30.

In FIG. 2, the overall system includes a wireless communication network 10, a wireless communication station 20 and a server 30, the former two again being exemplified with a GSM/GPRS network 10 and a GPRS mobile station 20, respectively. The designs of these three elements correspond to that already described with reference to FIG. 1. Hence, these elements are referred to with the same reference numerals as used in FIG. 1, and their composition will not be further described. Also the basic functioning of these elements correspond to what has previously been described with reference to FIG. 1. However, their operation in accordance with the embodiment of FIG. 2 differs somewhat from the operation previously described with reference to FIG. 1.

As stated, the embodiment of FIG. 2 is preferred when there is no existing packet data session between the GPRS station 20 and the server 30. The embodiment is particularly suitable when server 30 wishes to push packet data to the GPRS station 20, while at the same time considering the GPRS station's radio transferring capabilities.

In general, pushing of packet data to a mobile user corresponds to a process in which the wireless communication network initiates a packet data transfer to the user's wireless communication station, wherein the packet data being transferred most often is received by the wireless communication network from an external source, i.e., a push server on an external network which is operatively connected to the wireless communication network. Normally, when pushing information to a wireless communication station there are three requirements that have to be met in order for a wireless communication network to be able to initiate the packet data transfer to the wireless station. These requirements are that 1) the wireless station has been switched on, 2) the wireless station has identified itself to those parts of the wireless communication network that provides the packet data service, and that 3) a Packet Data Protocol (PDP) address has been allocated to the wireless station.

In a GSM/GPRS network, after the requirements above have been met, measures are taken by the GSM/GPRS network for initializing and activating a packet data service to the wireless GPRS station, measures that are well known in the art. After activation of the packet data service, packet data addressed to the PDP address that has been allocated to a GPRS station will be routed to that station.

A PDP address can be allocated to a wireless communication station either as a static or a dynamic PDP address. Thus, the PDP address to be used by a server wishing to push data to a wireless station, i.e., to transfer data without the station having specifically requested the data, is either a permanent (static) or a temporary (dynamic) address allocated to that station.

The PDP address, irrespective of whether it is static or dynamic, needs to be known to a server that wishes to push packet data to the station. The PDP address can become known to the server by making an inquiry to the appropriate repository, possibly to different repositories depending on whether static or dynamic addresses are used, in the operator's wireless communication network.

As stated, the embodiment of FIG. 2 is suitable when there is no existing packet data session between the push server 30 and the GPRS station 20. In order to facilitate establishment of such a packet data session, use is made of a node 40 providing a service for transferring short messages to users connected to the wireless communication network 10. In this described embodiment the wireless network is exemplified with a GSM/GPRS network 10, thus, the node 40 is exemplified with an SMS-C (Short Message Service switching Center). The SMS-C 40 is responsible for transmitting SMS (Short Message Service) messages to wireless stations, such as the GPRS station 20, in the GSM/GPRS network 10 in accordance with techniques that are well known to persons skilled in the art. The interface circuitry means 31 provides hardware circuitry for enabling the server 30 to communicate with the SMS-C 40 over a transport protocol such as TCP/IP or X25. The operation of the embodiment of FIG. 2 will now be described.

1. The operation starts when the server 30, which is operatively connected to the GSM/GPRS network 10 via, e.g., the Internet (not shown), wants to push packet data to a GPRS mobile station 20 over a TCP/IP connection. As indicated with arrow 1, the server 30 connects to the Short Message Service Centre (SMS-C) 40 and submits a request to the SMS-C 40 to transmit an SMS short message to a GPRS mobile station 20 having a particular Mobile Station Integrated Services Digital Network (MSISDN) number. The payload part of the SMS message includes a request for information relating to the radio transferring capabilities of the addressed GPRS station. The SMS message further includes the server's 30 IP-address and the server's 30 port number to be used for when setting up a TCP/IP-based connection towards the server 30.

2. As a result of the above, and indicated with arrow 2 in FIG. 2, the SMS-C 40 sends an SMS message to the GPRS station 20 through the GSM/GPRS network 10 over a GSM signaling channel or on a GPRS traffic channel in accordance with state of the art techniques. The GPRS station 20 has an application that is started, or, which is already running, when the SMS message is received by the GPRS station. The SMS message could, e.g., include an activation code and if the code corresponds to a predefined code which is accepted by the application, the application processing proceeds, otherwise the application processing is stopped. Thus, if no activation code is found, the SMS message is treated in the usual way, which is outside the scope of the present invention. If the activation code is present, the application extracts the payload of the SMS message and examines the request for radio capabilities in the same way as that described with reference to FIG. 1. The application furthermore extracts the transmitted IP address and port number associated with the application executing on the server 30 and wishing to push packet data.

3. The application processing then continues to the GPRS connection phase. The user of the GPRS station 20 could be provided with a scheme for accepting or denying reception of the information to be pushed from the server, e.g., causing the GPRS connection phase to be continued or aborted, such scheme however being outside the scope of the present invention. If the service/information offered is accepted, the application identifies the GPRS station 20 for the packet data service part of the GSM/GPRS network 10, if it is not already identified. This corresponds to checking whether the GPRS station 20 is GPRS attached or not. If the GPRS station is not attached, the application performs a GPRS attach. The GPRS attach is preferably performed in accordance with standard procedure, see for example Draft ETSI EN 301 344 V6.4.0 (1999-08), chapter 6.2. The GPRS application then checks if the GPRS station 20 has a valid IP-address(i.e., if it has a working TCP/IP connection). If not, the application requests the GSM/GPRS network 10 to activate a packet data service to be used by the GPRS station 20, i.e., it initiates the performance of a GPRS PDP Context Activation. The GPRS application then either receives a dynamically allocated IP-address from the GSM/GPRS network 10 or from a Radius server (not shown) via the GSM/GPRS network. The GPRS PDP Context Activation and the transfer of a dynamic IP-address are preferably performed in accordance with standard procedure, see for example TS 101 348 V6.3.0 (1998-10), chapter 11.2.1.2. However, the received packet data network address could be an address of any other packet data protocol, such as an X.25 address. Of course, the GPRS application could alternatively already have a static IP address allocated to it when initiating the GPRS PDP Context Activation. The application of the GPRS station 20 then initiates establishment of a TCP/IP connection towards the IP-address and the port number received in the SMS message. The IP address and the port number designates the server 30 and its application wishing to push packet data. The established TCP/IP connection is indicated with bidirectional arrow 3 in FIG. 2

4. As previously described with reference to FIG. 1, the GPRS application prepares a response message to be transmitted to the server 30. This response message is now transmitted over the established TCP/IP connection, the transmission being indicated with arrow 4. The response message includes the GPRS station's 20 current static and/or dynamic radio capabilities.

5. When the server 30 receives the response message from the GPRS station 20, the server application extracts and analyses the included information as previously described with reference to FIG. 1. The server application recognizes that the response message was transmitted from the GPRS station 20 to which the request was directed. This recognition is based on information which the GPRS station 20 has included in the response message, e.g., the MSISDN of the GPRS station 20 or a request code originally generated and included in the request by the server application. In the same way as already described with reference to the embodiment of FIG. 1, the server 30 will now have knowledge of the maximum static and/or dynamic capability of the GPRS station 20 and will adapt the information content accordingly before pushing the adapted information as packet data to the GPRS station 20 over the TCP/IP connection set up by the application in the GPRS station 20. The adaptation of the information content, its consequences and the purpose thereof have previously been described with reference to FIG. 1. As in the embodiment of FIG. 1, the resulting information transfer will have a reasonable transmission time and be free of any annoying transmission delays due to bandwidth capacity problems.

Although the invention has been described with reference to a specific exemplifying embodiment based on a GSM system providing a GPRS service, many different alterations, modifications and the like will become apparent for those skilled in the art. The described embodiments are therefore not intended to limit the scope of the invention, as defined by the appended claims. Instead, it is to be understood that the present invention is well suited for any wireless communication network that provides a packet data service to its connected wireless stations.

What is claimed is:

1. A method of a server in connection with transmission of packet data to a wireless communication station via a wireless communication network, the method comprising:
    transmitting, from the server to the wireless communication station, a request for the wireless communication station to identify its radio transferring capabilities and to respond with said radio transferring capabilities, wherein said server provides in said request its own packet data network address;
    receiving, at the server and from the wireless communication station, a response to the request, the response identifying to the server the radio transferring capabilities of the wireless communications station and said response being received as packet data over a packet data session, said racket data session having been established by said wireless communication station using said packet data network address of said server; and
    after the server receives the response, adapting, at the server, information content of a message to be transmitted from the server to the wireless communication station, the information content being adapted based upon the radio transferring capabilities of the wireless communication station as identified in the response from the wireless communication station to said request.

2. The method as claimed in claim 1, wherein said adapting comprises adapting the information content with respect to the bandwidth of said radio transferring capabilities associated with the wireless communication station, thereby facilitating a smooth transfer of the adapted information content to the wireless communication station.

3. The method as claimed in claim 1, wherein said request for information comprises a request for the wireless communication station's static radio transferring capabilities.

4. The method as claimed in claim 1, wherein said adapting is based upon a radio access classmark of the wireless communication station received in said response.

5. The method as claimed in claim 1, wherein said request for information comprises a request for the wireless communication station's dynamic radio capabilities which currently are assigned to the wireless communication station.

6. The method as claimed in claim 1, wherein said adapting is based upon a radio priority allocated to the wireless communication station and received in said response.

7. The method as claimed in claim 1, wherein said transmitting a request comprises initiating transmission of a short message to the wireless communication station using a short message service provided by the wireless communication network, wherein said request for information is provided to be included in the payload data of said short message.

8. The method as claimed in claim 7, wherein the server further provides its own packet data network address in the payload data of said short message, thereby enabling the receiving wireless communication station to establish the packet data session with the server, and wherein said response is received as packet data over the established packet data session.

9. The method as claimed in claim 1, wherein when said request is transmitted, said server is unaware of a packet data network address of said wireless communication station, and used by said wireless communication station in establishing the packet data session with said server.

10. The method as claimed in claim 1, wherein said information content of said message is intended to be displayed by the wireless communication station to a user of the wireless communication station.

11. A computer-readable medium storing computer-executable components for causing a server which is operatively connected to a wireless communication network to perform the acts recited in claim 1 when the computer-executable components are run on a general purpose computer included by the server.

12. A server being operatively connected to a wireless communication network, the server including processing means, memory means and interface circuitry means for performing the acts recited in claim 1.

13. A method of a wireless communication station in connection with reception of packet data via a wireless communication network to which the wireless station is operatively associated, the method comprising:
    receiving, from an originator of information, a request that the wireless communication station identify its radio transferring capabilities and respond to the originator of information a response that includes the radio transferring capabilities of the wireless communication station, said request including a packet data network address of said originator;
    establishing a packet data session with said originator using said packet data network address; and
    transmitting to said originator the response to said request, wherein information describing the radio transferring capabilities associated with the wireless communication station is included in the response, and wherein the response is transmitted as packet data over the established packet data session.

14. The method as claimed in claim 13, wherein said information of said response comprises the wireless communication station's static radio transferring capabilities.

15. The method as claimed in claim 13, wherein said information of said response comprises the radio access classmark of the wireless communication station.

16. The method as claimed in claim 13, wherein said information of said response comprises the wireless communication station's dynamic radio transferring capabilities which currently are assigned to the wireless communication station.

17. The method as claimed in claim 13, wherein said information of said response comprises the radio priority allocated to the wireless communication station by the wireless communication network.

18. The method as claimed in claim 13, wherein said receiving a request comprises receiving a short message from a short message service provided by the wireless communication network, wherein said request for information is extracted from the payload data of said short message.

19. The method as claimed in claim 18, further comprising:
    extracting the packet data network address of the originator from the payload data of said short message.

20. A computer-readable medium storing computer-executable components for causing a wireless communication station which is operatively associated with a wireless communication network to perform the acts recited in claim 13 when the computer-executable components are run on microprocessor included by the wireless communication station.

21. A wireless communication station being operatively associated with a wireless communication network, the wireless communication station comprising processing means, memory means and interface circuitry means for performing the acts recited in claim 13.

* * * * *

UNITED STATES PATENT AND TRADEMARK OFFICE
CERTIFICATE OF CORRECTION

PATENT NO.           : 7,440,439 B2                                          Page 1 of 1
APPLICATION NO.      : 10/034238
DATED                : October 21, 2008
INVENTOR(S)          : Hans Johansson et al.

It is certified that error appears in the above-identified patent and that said Letters Patent is hereby corrected as shown below:

On the Title Page,

Item (57), under "Abstract" line 9, after "any" insert -- network --.

Item (57), under "Abstract" line 13, after "time" insert -- and --.

In column 11, line 24, in Claim 1, delete "racket" and insert -- packet --, therefor.

In column 13, line 5, in Claim 20, after "on" insert -- a --.

In column 13, line 6, in Claim 20, delete "included by" and insert -- at --, therefor.

Signed and Sealed this
Twenty-sixth Day of April, 2011

David J. Kappos
*Director of the United States Patent and Trademark Office*